July 7, 1964 W. MINKENBERG 3,139,637
DIFFERENTIAL FEED MEANS FOR TOOL SPINDLE
Filed Sept. 23, 1960
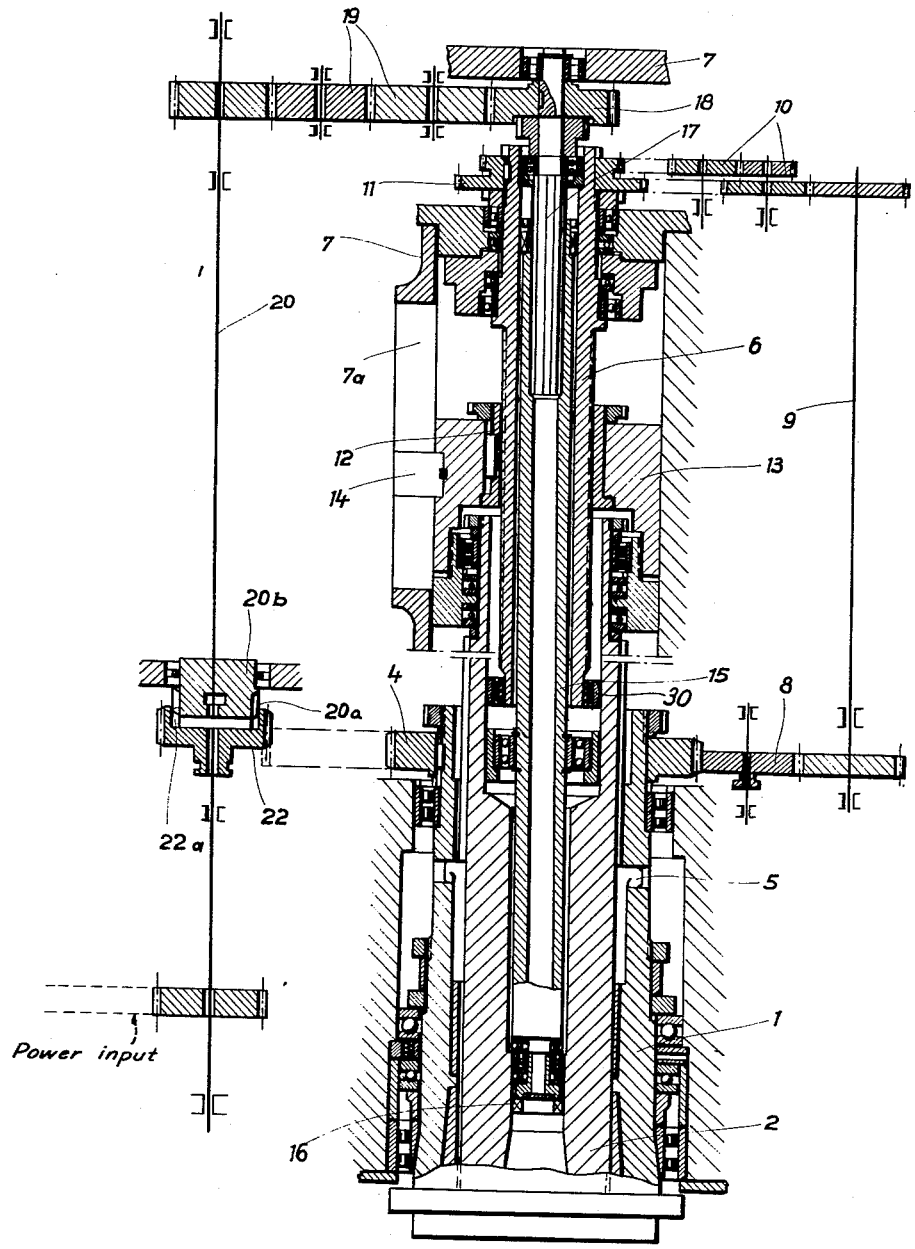
INVENTOR.
BY

United States Patent Office 3,139,637
Patented July 7, 1964

3,139,637
DIFFERENTIAL FEED MEANS FOR TOOL
SPINDLE
Willi Minkenberg, Monchen-Gladbach-Rheindahlen, Germany, assignor to Maschinenfabrik Frariep G.m.b.H., Rheydt, Rhineland, Germany
Filed Sept. 23, 1960, Ser. No. 58,063
Claims priority, application Germany Sept. 24, 1959
6 Claims. (Cl. 10—139)

The present invention relates to a boring mechanism comprising a main spindle and a boring spindle located within said main spindle and adapted, by means of a feeding device, to be displaced in an axial direction.

Boring mechanisms are known, in which such feeding device is arranged concentrically. Furthermore, boring devices are known, which comprise an inner spindle arranged in the center of the main spindle. However, the feeding operation is effected from a point outside the main spindle, whereby the guiding bearings are subjected to lateral loads since the force cannot act concentrically. In addition thereto, with said last mentioned arrangement, a further machining of the sliding surfaces of the feeding device is necessary.

It is, therefore, an object of the present invention to provide a boring mechanism having a main spindle with an interior boring spindle, which will overcome the above mentioned drawbacks.

It is a further object of the invention to provide a boring mechanism with a main spindle and an inner spindle mounted in said main spindle, in which the inner spindle will be able to rotate at high speed and may be used for cutting a thread.

It is another object of this invention to provide a boring mechanism with a main spindle having a boring spindle mounted therein, which will make it possible to cut a thread with a pitch corresponding to the difference in revolutions per minute of the main spindle and of the inner spindle.

These and other objects and advantages of the invention will appear more clearly from the following specification and drawing, which shows a longitudinal section through a boring mechanism according to the invention.

The above mentioned objects have been realized according to the present invention by passing an inner spindle through a hollow feeding spindle serving for transporting the rotatable boring spindle, the lower end of said inner spindle being rotatably fastened in the boring spindle. Such an arrangement makes it possible, when boring with the said rotating inner spindle, to do away with additional adjustments because the boring spindle and the inner spindle will rotate about a common axis. Furthermore, the said arrangement also permits a faster mounting of the tool arm.

According to a practical embodiment of an arrangement according to the invention, there is provided a splined shaft, which is journalled in the housing at the upper end of the inner spindle and is drivingly connected to the main drive through gears while telescopically engaging the inner spindle. It this way, the inner spindle will, in any working position, be positively drivingly connected to the main drive. All spindles of the boring tool or boring mechanism are driven by a common main drive. In this connection, the inner spindle preferably rotates at twice the speed of that of the boring spindle. The drive of the inner spindle is adapted, by means of a clutch, to be connected to the main drive, while the boring spindle remains drivingly connected to the main drive but may also, by means of the same clutch, be disengaged from the main drive.

According to a specific embodiment, the driving pinion for the main spindle is designed as a clutch for controlling the drive of the inner spindle.

More specifically, with reference to the drawing, the main spindle 1 has axially displaceably journalled therein a boring spindle 2. The main spindle may be driven by the main drive through a pinion 22 and gear 4. Main spindle 1 and boring spindle 2 are interconnected by means of keys 5, or the like, whereby the rotative movement of the main spindle is conveyed to the boring spindle. One end of a feeding spindle 6 is journalled in the boring spindle 2 at 30 whereas the other end of the feeding spindle 6 is journalled in the housing 7 of the tool arm. The feeding spindle 6 is bored hollow and is driven by gear 4 through the intervention of intermediate gears 8, a shaft 9 and change gears 10 adapted to mesh with a double gear 11. The said feeding spindle 6 is provided with an outer thread engaged by a threaded nut 12. This nut 12 is fastened in a sleeve 13 and conveys a rotative movement of the feeding spindle as axial feeding movement on to the boring spindle 2. In order to prevent sleeve 13 from rotating in the housing 7, it is guided in said housing by means of a guiding member 14, the guiding groove 7a in said housing being provided with a reinforcement.

The inner spindle 15 extends through the interior of the feeding spindle 6 and has its lower end extending into the boring spindle 2 and rotatably fastened therein while being non-displaceable in axial direction. The lower end of interior spindle 15 is provided with jaws 16, or the like, for receiving a tool carrier. The upper end of the hollow inner spindle is provided with splines for engagement with a correspondingly splined shaft 17. The splined shaft 17, on one hand, is journalled in the housing 7 and, on the other hand, in the feeding spindle 6. The said shaft 17 is provided with a gear 18 which, through the intervention of intermediate gears 19 and a shaft 20, is adapted to be connected to pinion 22 and, thus to the main drive. This pinion 22 may advantageously be designed as a clutch. To this end, the said pinion 22 is provided with inner teeth 22a corresponding to the outer teeth 20a of a clutch member 20b on the shaft 20.

Inasmuch as the inner spindle 15, as mentioned above, is fastened in the boring spindle 2, a feeding movement produced by the feeding spindle 6 will also be conveyed on to said spindle 15. Spindle 15, however, remains in each working position in driving connection with the drive therefor because the splined shaft 17 telescopically engaging the interior of the spindle 15 is longer than the maximum possible feeding movement.

Pinion 22 designed as a clutch may, as indicated in the drawing, be shifted so that half of it will mesh with the gear 4, while the other half meshes with the inner teeth 22a. In this way, the inner spindle 15 as well as the boring spindle 2 are drivingly connected to the main drive. With the arrangement adjusted in this manner, it is possible to cut a thread, the pitch of which is determined by the difference of the r.p.m. of the main spindle and of the r.p.m. of the inner spindle. When the pinion 22 meshes only with the inner teeth 20a, the inner spindle only is drivingly connected to the main drive. When the pinion 22 meshes only with gear 4, only the main spindle is connected with the main drive.

The transmission ratios of the various gears are selected with regard to each other preferably in such a manner that the inner spindle 15 will rotate at the speed of the main drive, whereas the main spindle 1 and thus the boring spindle 2 will have only half the speed. The speed of the feeding spindle 6 is variable by means of change gears 10 and may be adapted to the respective desired conditions of operation. In this way, a boring mechanism will be obtained with a fast rotating inner spindle, which may also be employed for cutting the threads.

It is, of course, to be understood that the present invention is not limited to the particular embodiment shown in the drawing, according to which the inner spindle rotates at twice the speed of the boring spindle. This particular speed ratio has been described only as particularly favorable.

It will be evident that the pitch of thread cut with the inner spindle is half the pitch of the thread cut by means of the boring spindle. This is particularly advantageous because, by means of the inner spindle, it is usually possible to cut smaller threads which also have a smaller pitch.

It is further to be understood that the present invention is, by no means, limited to the particular construction shown in the drawing, but also comprises any modifications within the scope of the appended claims.

What I claim is:

1. In a boring mechanism: a non-axially movable but rotatable main spindle, a hollow boring spindle having a tool receiving end and axially displaceably mounted in and connected to said main spindle so as to rotate therewith, a non-axially movable but rotatable feeding spindle coaxially arranged with regard to said boring spindle, thread means connecting the feeding spindle to the boring spindle whereby rotation of the feeding spindle will cause axial movement of the boring spindle, means drivingly connecting said feeding spindle with said main spindle for rotation of said feeding spindle in response to rotation of the main spindle thereby to impart an axial movement upon said boring spindle, an inner spindle rotatably arranged within said feeding spindle and said boring spindle and coaxial therewith and connected to the latter for axial movement therewith, said inner spindle having a tool receiving end adjacent the tool receiving end of said boring spindle, main drive means, coupling means operable for selectively drivingly connecting said main drive means individually with said main spindle and said inner spindle and with both thereof simultaneously for driving one or both of said main spindle and said inner spindle in rotation.

2. An arrangement according to claim 1, which includes the driving connection from said main drive means to said inner spindle, an axially extending splined bore in said inner spindle, a non-axially movable splined shaft telescopically engaging said splined bore, and means for connecting said shaft with said main spindle.

3. An arrangement according to claim 2, which includes a clutch member driven by said main drive means and having a first position of driving engagement with said shaft, a second position of driving engagement with said main spindle, and a third position of driving engagement with both of said main spindle and shaft.

4. An arrangement according to claim 2, in which the driving connection from said main drive means to said inner spindle and from said main spindle to said boring spindle includes transmission means, said transmission means having drive ratios such that said inner spindle will rotate at twice the speed of said boring spindle.

5. An arrangement according to claim 3, in which said clutch member comprises an internal and external gear drivingly connected to the main drive means, a first gear on said shaft, a second gear on said main spindle, and said internal and external gear being adapted selectively to engage and disengage each of said first and second gear means one at a time to drive one only of said inner spindle and main spindle, and also to engage both thereof at one time simultaneously to drive both of said inner spindle and main spindle.

6. In a boring mechanism: a rotatable main spindle, a hollow boring spindle having a tool receiving end and axially displaceably mounted in and connected to said main spindle so as to rotate therewith, a rotatable feeding spindle arranged in axial alignment with said boring spindle and operable in response to a rotative movement of said feeding spindle to impart an axial movement upon said boring spindle, an inner spindle rotatably arranged within said feeding spindle and said boring spindle and connected to the latter for axial movement therewith, said inner spindle having a tool receiving end adjacent the tool receiving end of said boring spindle, said inner spindle being provided with a bore, shaft means telescopically and drivingly engaging said bore, drive means adapted drivingly to connect said shaft means to said main spindle, and gear means adapted drivingly to connect said main spindle to said feeding spindle.

References Cited in the file of this patent

UNITED STATES PATENTS

| | | |
|---|---|---|
| 1,094,425 | Cash | Apr. 28, 1914 |
| 1,167,012 | Neuteboom | Jan. 4, 1916 |
| 1,865,022 | Larson | June 28, 1932 |
| 2,345,060 | Morton | Mar. 28, 1944 |
| 2,368,359 | Hellstrom | Jan. 30, 1945 |
| 2,896,308 | Swords | July 28, 1959 |

FOREIGN PATENTS

| | | |
|---|---|---|
| 41,043 | Austria | Feb. 25, 1910 |